United States Patent
Avivi et al.

(10) Patent No.: US 10,126,633 B2
(45) Date of Patent: Nov. 13, 2018

(54) LOW PROFILE TRI-AXIS ACTUATOR FOR FOLDED LENS CAMERA

(71) Applicant: Corephotonics Ltd., Tel-Aviv (IL)

(72) Inventors: Gal Avivi, Haifa (IL); Gal Shabtay, Tel Aviv (IL); Ephraim Goldenberg, Ashdod (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 15/310,902

(22) PCT Filed: Jun. 7, 2016

(86) PCT No.: PCT/IB2016/053335
§ 371 (c)(1),
(2) Date: Nov. 14, 2016

(87) PCT Pub. No.: WO2016/207754
PCT Pub. Date: Dec. 29, 2016

(65) Prior Publication Data
US 2018/0120674 A1 May 3, 2018

Related U.S. Application Data

(60) Provisional application No. 62/183,974, filed on Jun. 24, 2015.

(51) Int. Cl.
*G03B 17/17* (2006.01)
*G02B 27/00* (2006.01)
(Continued)

(52) U.S. Cl.
CPC ......... *G03B 17/17* (2013.01); *G02B 27/0075* (2013.01); *G02B 27/64* (2013.01);
(Continued)

(58) Field of Classification Search
CPC . G03B 17/17; G03B 5/06; G03B 3/10; G03B 17/04; H04N 5/2257; G02B 27/64; G02B 27/0075
(Continued)

(56) References Cited

U.S. PATENT DOCUMENTS 3,760,704 A 9/1973 Baker
9,448,382 B2 9/2016 Shabtay et al.
(Continued)

FOREIGN PATENT DOCUMENTS

WO 2015/001519 A2 1/2015
WO 2015/015383 A1 2/2015
WO 2016/166730 A2 10/2016

OTHER PUBLICATIONS

Office action in related Korean national phase patent application 10-2017-7028150, dated Feb. 21, 2018.
(Continued)

*Primary Examiner* — Nhan T Tran
*Assistant Examiner* — Chan T Nguyen
(74) *Attorney, Agent, or Firm* — Nathan & Associates; Menachem Nathan

(57) ABSTRACT

Folded camera modules in which the camera module height is determined by a folded lens module diameter and by the lens module movement in a direction perpendicular to the lens optical axis, and dual-aperture cameras including such folded camera modules. A folded camera module includes OIS and AF actuators having dimensions smaller than the camera module height and therefore not adding to the camera module height.

20 Claims, 4 Drawing Sheets

(51) Int. Cl.
*H04N 5/225* (2006.01)
*G03B 3/10* (2006.01)
*G03B 5/02* (2006.01)
*G02B 27/64* (2006.01)
*G03B 5/06* (2006.01)
*G03B 17/04* (2006.01)

(52) U.S. Cl.
CPC ............... *G03B 3/10* (2013.01); *G03B 5/02* (2013.01); *G03B 5/06* (2013.01); *G03B 17/04* (2013.01); *H04N 5/2257* (2013.01); *G03B 2205/0007* (2013.01)

(58) Field of Classification Search
USPC ........................................... 348/357
See application file for complete search history.

(56) References Cited

U.S. PATENT DOCUMENTS

| | | | |
|---|---|---|---|
| 2007/0035631 A1* | 2/2007 | Ueda | G03B 5/00 348/208.99 |
| 2008/0079813 A1 | 4/2008 | Suzuki | |
| 2009/0219547 A1 | 9/2009 | Kauhanen et al. | |
| 2009/0252484 A1 | 10/2009 | Hasuda | |
| 2010/0231779 A1* | 9/2010 | Lin | G02B 7/021 348/335 |
| 2012/0320467 A1* | 12/2012 | Baik | G02B 7/08 359/824 |
| 2013/0050828 A1* | 2/2013 | Sato | G02B 27/64 359/557 |
| 2014/0218799 A1 | 8/2014 | Suzuka | |
| 2015/0028195 A1 | 1/2015 | King et al. | |
| 2016/0044247 A1 | 2/2016 | Shabtay et al. | |

OTHER PUBLICATIONS

Office action in related EP national phase patent application 16813806.3, dated May 3, 2018.
International Search Report and Written Opinion issued in related PCT patent application PCT/IB2016/053335, dated Oct. 28, 2016. 6 pages.

* cited by examiner

LOW PROFILE TRI-AXIS ACTUATOR FOR FOLDED LENS CAMERA

CROSS-REFERENCE TO RELATED APPLICATIONS

This application is a 371 application from international patent application PCT/IB2016/053335, and is related to and claims priority from U.S. Provisional Patent Application No. 62/183,974 filed on Jun. 24, 2015, which is expressly incorporated herein by reference in its entirety.

FIELD

Exemplary embodiments disclosed herein relate in general to digital cameras and in particular to optical image stabilization (OIS) and auto-focus (AF) in single and/or dual-aperture ("dual-optical module") digital cameras.

BACKGROUND

In recent years, mobile devices such as cell-phones (and in particular smart-phones), tablets and laptops have become ubiquitous. Most of these devices include one or two compact cameras: a main rear-facing camera (i.e. a camera on the back side of the device, facing away from the user and often used for casual photography) and a secondary front-facing camera (i.e. a camera located on the front side of the device and often used for video conferencing).

Although relatively compact in nature, the design of most of these cameras is very similar to the traditional structure of a digital still camera, i.e. they comprise an optical component (or a train of several optical elements and a main aperture) placed on top of an image sensor. The optical component (also referred to as "optics") refracts the incoming light rays and bends them to create an image of a scene on the sensor. The dimensions of these cameras are largely determined by the size of the sensor and by the height of the optics. These are usually tied together through the focal length ("f") of the lens and its field of view (FOV)—a lens that has to image a certain FOV on a sensor of a certain size has a specific focal length. Keeping the FOV constant, the larger the sensor dimensions (e.g. in a X-Y plane) the larger the focal length and the optics height.

In addition to the optics and sensor, modern cameras usually further include mechanical motion (actuation) mechanism for two main purposes: focusing of the image on the sensor and optical image stabilization (OIS). For focusing, in more advanced cameras, the position of the lens module (or at least one lens element in the lens module) can be changed by means of an actuator and the focus distance can be changed in accordance with the captured object or scene. In these cameras it is possible to capture objects from a very short distance (e.g., 10 cm) to infinity. The trend in digital still cameras is to increase the zooming capabilities (e.g. to 5x, 10x or more) and, in cell-phone (and particularly smart-phone) cameras, to decrease the pixel size and increase the pixel count. These trends result in greater sensitivity to hand-shake or in a need for longer exposure time. An OIS mechanism is required to answer the needs in these trends.

In OIS-enabled cameras, the lens or camera module can change its lateral position or tilt angle in a fast manner to cancel the handshake during the image capture. Handshakes move the camera module in 6 degrees of freedom, namely linear movements in three degrees of freedom (X, Y and Z), pitch (tilt around the X axis), yaw (tilt around the Y axis) and roll (tilt around the Z axis). FIG. 1 shows an exemplary classical four rod-springs (102a-d) OIS structure in a single-aperture camera module 100. The four rod-springs are rigidly connected to an upper frame 104 which accommodates usually an AF actuator (not shown) that moves the lens module 106. This structure allows desired modes of movement in the X-Y plane (translation), FIG. 1a, but also allows a mode of unwanted rotation (torsion) around the Z axis, FIG. 1b. The latter may be due to a combination of several causes such as asymmetric forces applied by the coils or by a user's (or phone) movements, imperfections of the rod-springs and the high rotational compliance of the four-spring rod-spring+frame structure.

In the case of a centered single-aperture camera module, the rotation around the Z axis (according to the exemplary coordinate system shown in FIG. 1) does not affect the image quality severely, since the lens is axisymmetric. However, this does affect OIS in a dual-camera module, FIG. 2A. FIG. 2A shows in (a) a rotation mode around an axis 202 (in the figure, parallel to the Z axis) that is roughly centered between two camera modules 204 and 206 of a dual-aperture camera 200. Because of the location of rotation axis 202, the rotation may cause significant deterioration of the image quality. The rotation causes each lens to shift away in undesired directions (shown by arrows in FIG. 2A(b)) in an unpredictable way. The result is motion blur of the image and a shift of the two lenses in opposite Y directions that results in decenter between images received by each camera module and therefore potentially in a catastrophic influence on fusion algorithm results.

Yet another problem may occur in a folded optics zoom dual-aperture camera, such as a camera 250 shown in FIG. 2B. Such a camera is described for example in detail in co-owned international patent application PCT/IB2016/052179. Camera 250 includes a "folded" camera module 252 with a first optical axis 270 and an upright (non-folded) camera module 254 with a second optical axis 272 perpendicular to axis 270. A 90° folding of an optical path parallel to axis 272 to an optical path parallel axis 270 is performed by an optical path folding element (OPFE) 274. The OPFE may exemplarily be a prism or mirror. Among other components, folded camera module 252 comprises a lens actuation sub-assembly for moving a lens module 256 (and a lens therein, which is referred to henceforth as "folded lens") in the X-Y plane. The lens actuation sub-assembly includes a hanging structure with four flexible hanging members (i.e. the "rod-springs" referred to above) 258a-d that hang lens module 256 over a base 260. In some exemplary embodiments, hanging members 256a-d may be in the form of four wires and may be referred to as "wire springs" or "poles". The hanging structure allows in-plane motion as known in the art and described exemplarily in co-owned U.S. patent application Ser. No. 14/373,490. Exemplarily, a first movement direction 262 of the lens is used to achieve AF and a second movement direction 264 is used to achieve OIS. A third movement, an unwanted rotation 266 of the lens about an axis parallel to the Z axis as described above actually causes an unwanted effect of dynamic tilt of the lens (the lens' optical axis may not be perpendicular to the sensor's surface due to that rotation) and may result in images that are usually sharp on one side and blurry on the other side. The actuators in such cameras are typically voice coil magnet (VCM) actuators. A major problem with known VCMs that provide (X, Y)-direction OIS movement and Z-direction AF movement is that the VCMs are larger along the X and Y axes than the moved lens module.

It would be advantageous to have a folded camera module with both AF and OIS mechanisms, where the incorporation of such mechanisms and capabilities should follow standard manufacturing processes and should not result in penalty in camera height. It would be further advantageous to have a folded-lens dual-aperture camera that incorporates such a folded camera module.

SUMMARY

In various exemplary embodiments there are provided folded camera modules having respective folded camera module heights, each folded camera module comprising a lens module carrying a lens having a first optical axis, an image sensor positioned at a first end of the folded camera module, a first actuator positioned at a side of the camera module and operable to provide a first movement of the lens module in a first ("focusing") direction parallel to the first optical axis, a second actuator positioned at a second end of the camera module and operable to provide a second movement of the lens module in a second ("height") direction perpendicular to the first direction, wherein the folded camera module height is defined by a diameter of the lens module and by a range of the second movement, and a third actuator positioned at the second end of the camera module and operable to provide a third movement of the lens module in a third ("width") direction perpendicular to both the first and second directions.

In an exemplary embodiment, an actuator dimension for each actuator in the direction of the camera height is smaller than the camera height.

In an exemplary embodiment, the folded camera module further comprises an OPFE configured to fold an optical path parallel to the first direction toward the first direction.

In an exemplary embodiment, the first movement is enabled by a plurality of rolling balls engaged in a plurality of grooves formed in a member attached to the lens module.

In an exemplary embodiment, the first movement is enabled by a plurality of leaf springs attached to the lens module.

In an exemplary embodiment, the second and third movements are enabled by leaf springs attached to a static part of the folded camera module located between the OPFE and the image sensor.

In an exemplary embodiment, the plurality of rolling balls and the plurality of grooves are dimensioned so as not to increase the folded camera module height.

In an exemplary embodiment, the plurality of leaf springs is dimensioned so as not to increase the folded camera module height.

In an exemplary embodiment, the folded camera module further comprises a fourth actuator positioned at the second end of the camera module and operable to provide a fourth movement to avoid roll around the first optical axis, the fourth actuator having an actuator dimension in the direction of the camera height smaller than the camera height.

In some exemplary embodiments, the OPFE is a prism. In some such embodiments, the lens module is rigidly attached to the prism, forming a lens-prism unit.

In some exemplary embodiments, the folded camera module is included with a second camera module in a dual-aperture camera. The second camera module may be an upright camera module with a second optical axis parallel to the second direction.

BRIEF DESCRIPTION OF THE DRAWINGS

Non-limiting examples of embodiments disclosed herein are described below with reference to figures attached hereto that are listed following this paragraph. The drawings and descriptions are meant to illuminate and clarify embodiments disclosed herein, and should not be considered limiting in any way. Like elements in different drawings may be indicated like numerals.

DETAILED DESCRIPTION

Figure 1:
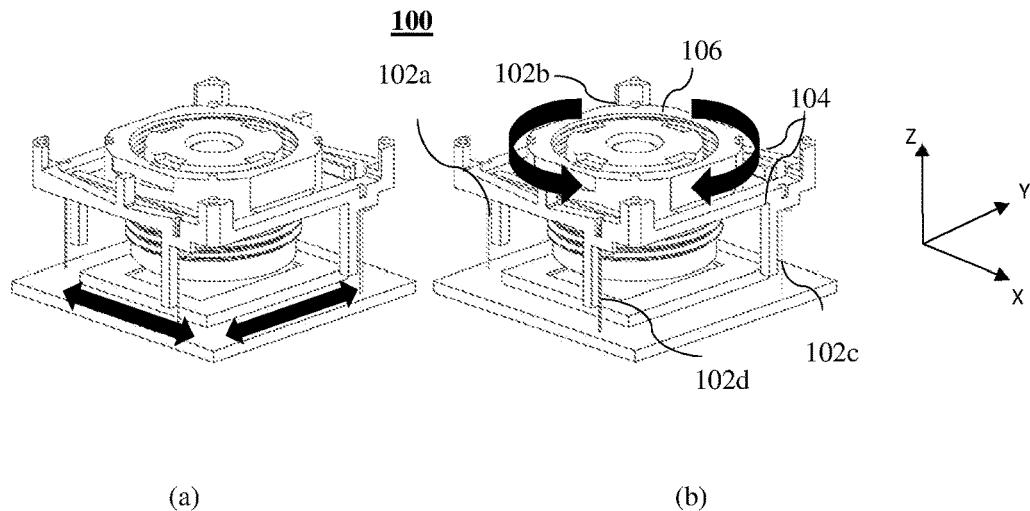
FIG. 1 shows a camera module with an exemplary classical four wire-springs OIS structure: (a) modes of wanted X-Y translations, and (b) mode of unwanted rotation around the Z axis.
Figure 2A:
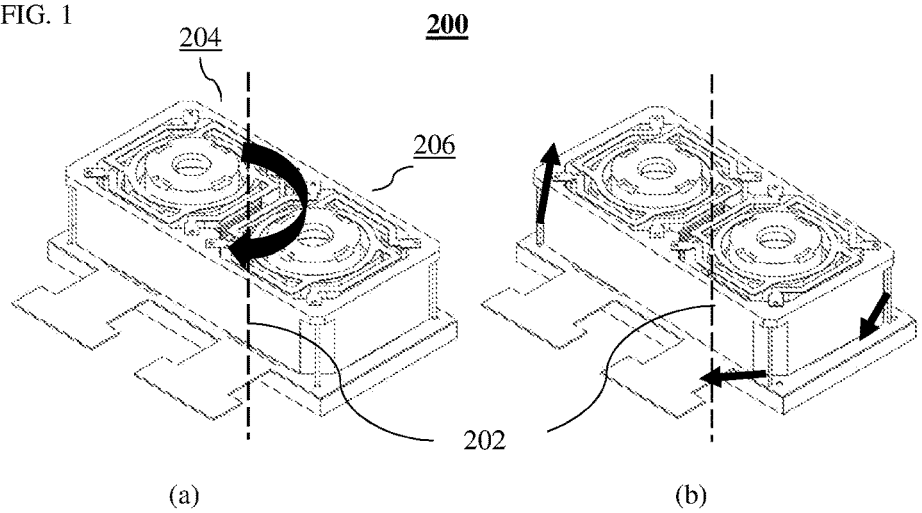
FIG. 2A shows a dual-aperture camera in (a) rotation mode around an axis roughly centered between two camera modules, and (b) movement of each lens in undesired directions.
Figure 2B:
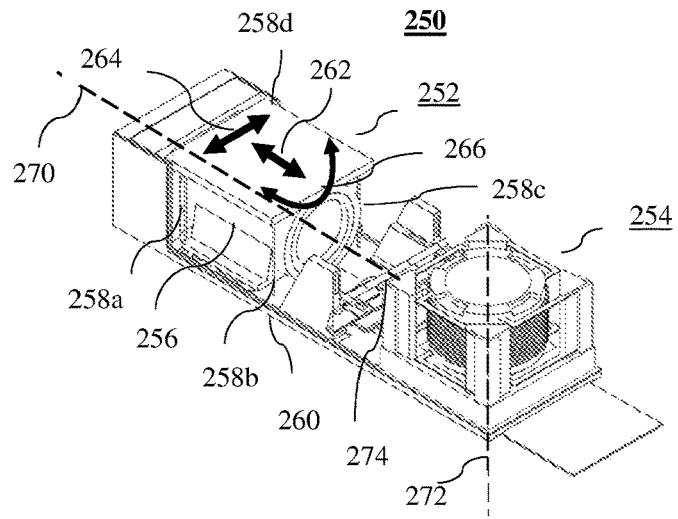
FIG. 2B shows a dual-camera module with a folded optics camera module.

In the description below the following system of X-Y-Z coordinates is chosen exemplarily and for explanation purposes only: the Z axis is parallel to the optical axis of the lens module of the folded camera module described below (referred to as "first" optical axis), whereas the X and Y axes are perpendicular to the Z axis and to each other and form a plane parallel to that of the folded camera image sensor, see e.g. FIG. 3. The X axis is also parallel to a "second" optical axis like axis 272 in FIG. 2B.

Figure 3A:
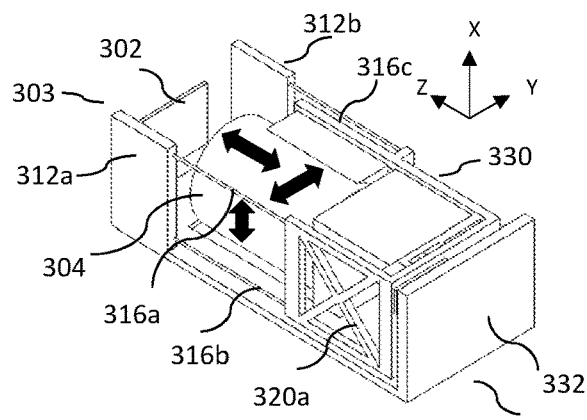
FIG. 3A shows schematically an isometric view of a first exemplary embodiment of a folded camera module disclosed herein.
Figure 3B:
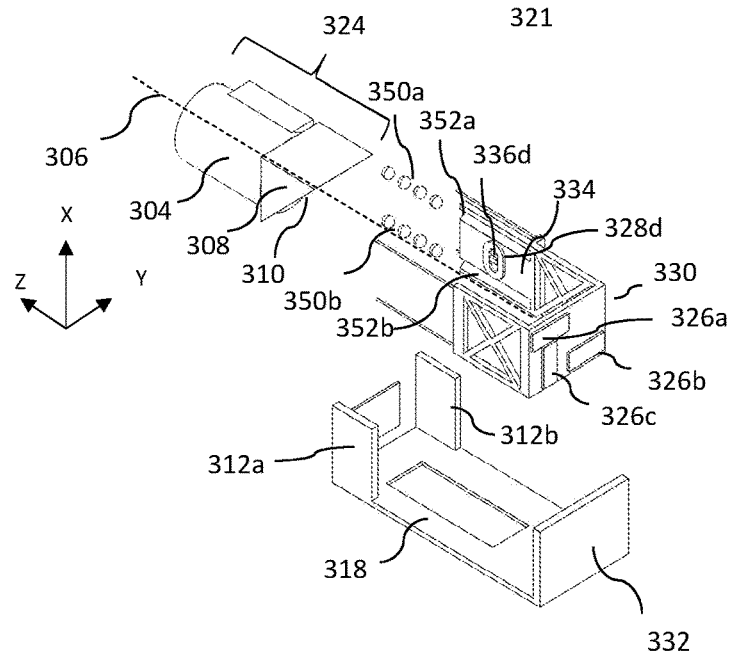
FIG. 3B shows schematically a first exploded isometric view of the folded camera module of FIG. 3A.
Figure 3C:
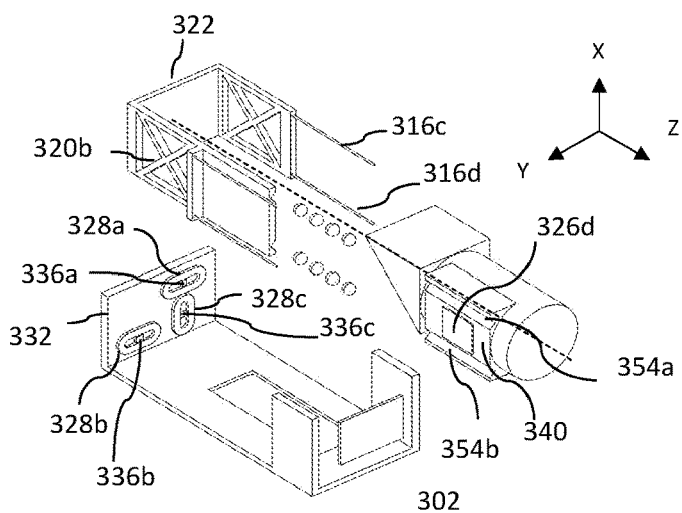
FIG. 3C shows schematically a second exploded isometric view of the folded camera module of FIG. 3A.

FIG. 3A shows schematically an isometric view of a first embodiment of a folded camera module numbered 300 according to an example disclosed herein. FIG. 3B shows schematically a first exploded isometric view of folded camera module 300 and FIG. 3C shows schematically a second exploded isometric view of the folded camera module 300. Like camera module 100 above, camera module 100 can exemplarily be included (incorporated) in a folded-lens dual-aperture camera like camera 250 or other cameras described in co-owned US patent application No. 20160044247. Camera module 300 comprises an image sensor 302 positioned at a first end 303 of camera module 300 and having an imaging surface in the X-Y plane, a lens module 304 with a first optical axis 306 parallel to the Z axis, and an OPFE in the form of a prism 308 having a reflecting plane 310 with a normal tilted at 45 degrees to the image sensor surface, such that light arriving from the X direction is tilted by the prism to the Z direction. The OPFE will henceforth be referred to generically as "prism", with the understanding that it can also be a mirror or any other reflecting element Lens module 304 is rigidly coupled to the prism and the two elements form a single "lens-prism unit" 324 (such that the lens and prism move together). In contrast with camera module 100, camera module 300 comprises a combined lens and prism actuation assembly (also referred to as lens-prism actuation assembly) for moving lens-prism unit 324 in three directions X-Y-Z. The lens-prism actuation assembly includes a hanging structure 316 comprising four flexible hanging members 316a-d that hang the lens-barrel unit between vertical sections 312a or 312b rigidly coupled to a base 318 and to a moving support structure 330. Members 316a-d may be in the form of four wires and may be referred to as "wire springs" or "poles". Hanging structure 316 allows X-Y motion as known in the art. Support structure 330 is shown exemplarily as having a U-shape, with two side members 320a and 320b and a back frame 322. The back panel is positioned at a second end 321 of the folded camera module, which is opposite to the first end along the first optical axis. Hanging members 316a-d extend between vertical sections 312a and 312b and side members 320a and 320b.

Note that as used herein, the terms "first end" and "second end" are not necessarily limited to physical ends of the folded camera module, but rather relate to positions along an optical path: the first end is in the optical path before the prism and/or the folded lens module, as in FIGS. 3A-C herein, while the second end is in the optical path after the folded lens module and/or an additional prism (the latter for example as in a folded camera module shown in FIG. 3 of co-owned US patent application No. 20160044247).

In camera module 300, the lens-prism actuation assembly comprises four actuators (e.g. voice coil motors or "VCM"s), each actuator including a respective magnet and coil. Thus, a first actuator comprises a magnet 326a and a coil 328a, a second actuator comprises a magnet 326b and a coil 328b, a third actuator comprises a magnet 326c and a coil 328c and a fourth actuator comprises a magnet 326d and a coil 328d. The first, second and third actuators are operable to impart to the lens-prism unit an in-plane motion relative to base 318 in substantially the X-Y plane, e.g. for OIS. These actuators are also operable to avoid lens-prism unit rotation (tilt) motion around the Z-axis. The fourth actuator is a "side" actuator, operable to impart the lens-prism unit a motion along the Z-axis for focusing (i.e. for autofocus). As shown in the exploded view in FIG. 3B, magnets 326a, 326b and 326c are positioned on back panel 332 that is parallel to back frame 322, while magnet 326d is positioned on a side panel 340 that is rigidly attached to the lens. Coils 328a, 328b and 328c are positioned on a back board 332 facing respective magnets 326a, 326b and 326c on back panel 332, while coil 328d is positioned on a side board 334 that is rigidly attached to side member 320b. The first, second and third actuators are also referred to as "back actuators" while the fourth actuator is also referred to as "side actuator". Position sensors (for example Hall bar position sensors) 336 are provided for each magnet-coil pair. For example, a Hall bar sensor 336a is positioned in proximity to magnet 326a, a Hall bar sensor 336b is positioned in proximity to magnet 326b, a Hall bar sensor 336c is positioned in proximity to magnet 326c and a Hall bar sensor 336d is positioned in proximity to magnet 326d. The movement along the Z axis for focusing, actuated by the side actuator, is enabled by two sets of rolling balls 350a and 350b arranged to engage and be positioned between two grooves 352a and 352b in side board 334 and two grooves 354a and 354b in side panel 340, as known in the art.

Advantageously, all four actuators are positioned so as not to add height to the folded camera module. The folded camera module height is solely determined by the diameter of the lens module and its movement range in the X direction (see also FIG. 4). The positioning of the side actuator components—magnet 326d on side panel 340 and of coil 328d on side board 334—is also advantageous for providing the Z direction movement without impacting camera module height. Further advantageously, the positioning of the actuators is such that they do not block or interfere with an optical path between on object being imaged and the folded camera module image sensor. Specifically, the prism is positioned between the actuators used for OIS and the image sensor. Further advantageously yet, a camera module disclosed herein may be low cost manufactured with proven technology.

In operation, a Lorentz force may be applied on magnets 326a-b along the X axis direction and on magnet 326c along the Y axis direction. Having these three forces on the three magnets allows three mechanical degrees of freedom in the motion of the center of mass of the lens and prism: linear X and Y motions and tilt around Z axis motion. The X-Y motion of the lens-prism unit can be measured by the respective Hall bars coupled to the magnetic field created by the respective magnets. Similarly, a Lorenz force may be applied by magnet 326d along the Z direction to allow linear motion along the Z axis. More details about the operation of the various actuators may be found in co-owned patent application No. PCT/IB2016/052179.

Figure 4A:
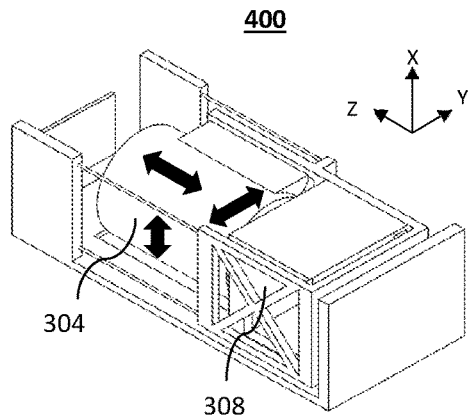
FIG. 4A shows schematically an isometric view of a second exemplary embodiment of a folded camera module disclosed herein.
Figure 4B:
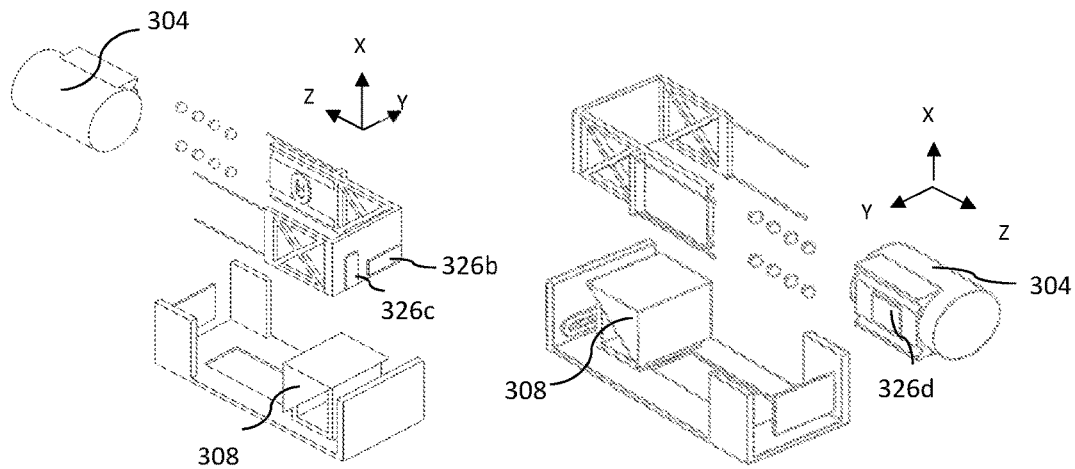
FIG. 4B shows schematically two exploded isometric views of the folded camera module of FIG. 4A.
Figure 4C:
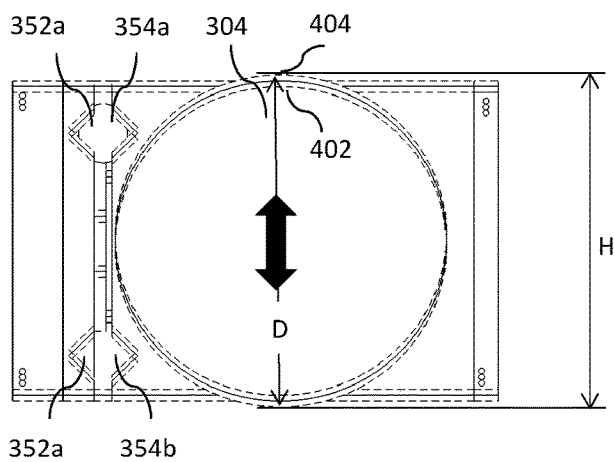
FIG. 4C shows schematically the small change in total camera height due to lens module X-axis movement.

FIG. 4A shows schematically an isomeric view of a second embodiment of a folded camera module numbered 400 according to an example disclosed herein. FIG. 4B shows schematically two exploded isomeric views of folded camera module 400, while FIG. 4C shows schematically the small change in total camera height due to lens module X-axis movement in camera module 400 as well as the total height dimension H. In general, embodiment 400 includes the same components as embodiment 300, except that the lens module is decoupled from the prism. The lens is movable in the X-Y plane while the prism is fixed (not moving). Since the lens is axisymmetric and the prism is fixed, tilt around Z does not affect the quality of an image obtained at the image sensor. For this reason, camera module 400 may include only three of the four actuators, i.e. only actuators 324b-d, since actuator 324a is not needed for the X-Y in-plane movement. Consequently, only three Hall-bar sensors are needed for position sensing. Of these, only 326b and 326c are shown. The change due to the lens module movement (i.e. the lens module movement range) is equal to the distance between by two extreme lens module positions, a lower position marked by 402 and an upper position marked by 404. The total height H of the folded camera module is determined by the lens module diameter D plus the change due to the lens module movement.

Figure 5A:
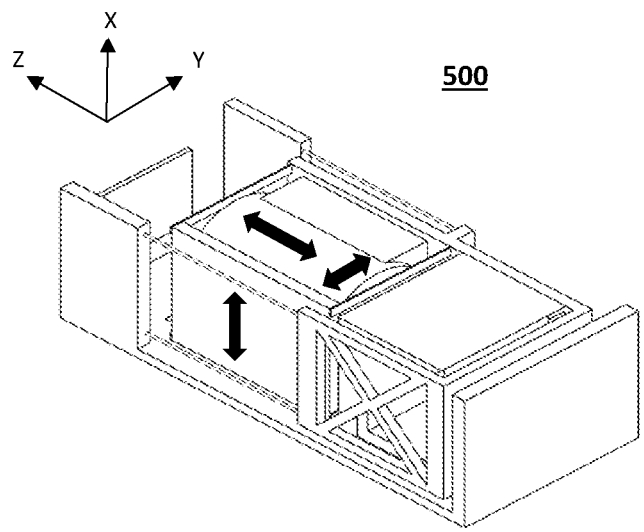
FIG. 5A shows schematically an isometric view of a third exemplary embodiment of a folded camera module disclosed herein.
Figure 5B:
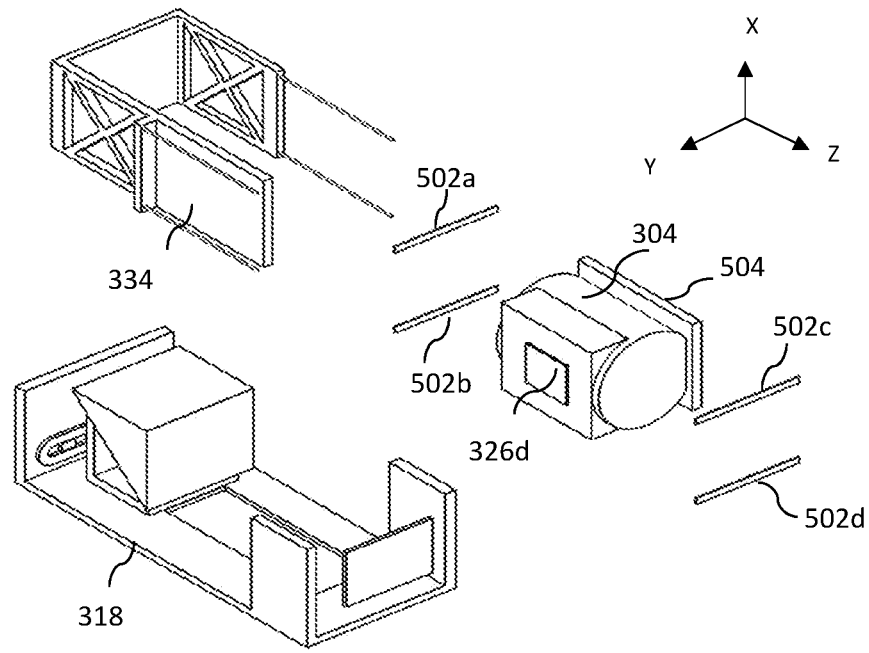
FIG. 5B shows schematically an exploded isometric view of the folded camera module of FIG. 5A.

FIG. 5A shows schematically an isomeric view of a third embodiment of a folded camera module numbered 500 according to an example disclosed herein. FIG. 5B shows schematically an exploded isomeric view of the folded camera module 500. In contrast with camera modules 300 and 400, in camera module 500 the movement along the Z axis for focusing is enabled by a hanging structure comprising four flexible hanging members 502a-d that hang the lens-barrel to side board 334. This removes the need for rolling balls and grooves. Members 502a-c may be leaf springs. Members 502a-d are mechanically coupled to lens module 304 through a panel 504 that is rigidly attached to the lens module. Actuation by the side actuator (of which only the magnet 326*d* is shown) causes flexing of members 502*a-d* in the Z-direction, allowing the Z-movement of the lens module for AF.

All patents and patent applications mentioned in this application are hereby incorporated by reference in their entirety for all purposes set forth herein. It is emphasized that citation or identification of any reference in this application shall not be construed as an admission that such a reference is available or admitted as prior art.

While this disclosure has been described in terms of certain embodiments and generally associated methods, alterations and permutations of the embodiments and methods will be apparent to those skilled in the art. For example, while the incorporation of a folded camera module described herein in a dual-aperture camera is described in some detail, a folded camera module may be incorporated in a multi-aperture camera with more than two camera modules. For example, while the use of Hall bars as exemplary position sensors is described in detail, other position sensors (for example MEMS-type) may be used for purposes set forth herein. The disclosure is to be understood as not limited by the specific embodiments described herein, but only by the scope of the appended claims.

What is claimed is:

1. A folded camera module having a respective folded camera module height and first and second ends, comprising:
  a) a lens module carrying a lens having a first optical axis;
  b) an image sensor positioned at the first end;
  c) a first actuator positioned at a side of the camera module and operable to provide a first movement of the lens module in a first direction parallel to the first optical axis;
  d) a second actuator positioned at the second end and operable to provide a second movement of the lens module in a second direction perpendicular to the first direction, wherein the folded camera module height is defined by a diameter of the lens module and by a range of the second movement;
  e) a third actuator positioned at the second end of the camera module and operable to provide a third movement of the lens module in a third direction perpendicular to both the first and second directions; and
  f) an optical path folding element (OPFE) configured to fold an optical path parallel to the second direction toward the first direction,
  wherein the second and third movements are enabled by leaf springs attached to a static part of the folded camera module located between the OPFE and the image sensor.

2. The folded camera module of claim 1, wherein an actuator dimension for each of the first, second and third actuators in the direction of the folded camera module height is smaller than the folded camera module height.

3. The folded camera module of claim 2, further comprising a fourth actuator positioned at the second end of the camera module and operable to provide a fourth movement to avoid roll around the first optical axis, the fourth actuator having an actuator dimension in the direction of the camera height smaller than the camera height.

4. The folded camera module of claim 3, wherein a fourth actuator dimension in the direction of the folded camera module height is smaller than the folded camera module height.

5. The folded camera module of claim 3, further comprising an optical path folding element (OPFE) configured to fold an optical path parallel to the second direction toward the first direction.

6. The folded camera module of claim 5, wherein the OPFE is a prism.

7. The folded camera module of claim 3, wherein the first movement is enabled by a plurality of rolling balls engaged in a plurality of grooves formed in a member attached to the lens module.

8. The folded camera module of claim 7, wherein the plurality of rolling balls and the plurality of grooves are dimensioned so as not to increase the folded camera module height.

9. The folded camera module of claim 3, wherein the first movement is enabled by a plurality of leaf springs attached to the lens module.

10. The folded camera module of claim 9, wherein the plurality of leaf springs is dimensioned so as not to increase the folded camera module height.

11. The folded camera module of claim 1, wherein the first movement is enabled by a plurality of rolling balls engaged in a plurality of grooves formed in a member attached to the lens module.

12. The folded camera module of claim 11, wherein the plurality of rolling balls and the plurality of grooves are dimensioned so as not to increase the folded camera module height.

13. The folded camera module of claim 1, wherein the first movement is enabled by a plurality of leaf springs attached to the lens module.

14. The folded camera module of claim 13, wherein the plurality of leaf springs is dimensioned so as not to increase the folded camera module height.

15. The folded camera module of claim 1, wherein the OPFE is a prism.

16. The folded camera module of claim 15, wherein the prism is fixed relative to the first, second and third actuators.

17. The folded camera module of claim 15, wherein the lens module is rigidly attached to the prism, forming a lens-prism unit.

18. The folded camera module of claim 17, wherein the prism is fixed relative to the first, second and third actuators.

19. The folded camera module of claim 1, included with a second camera module in a dual-aperture camera.

20. The folded camera module of claim 19, wherein the second camera module is an upright camera module with a second optical axis parallel to the second direction.

* * * * *